Feb. 22, 1949.  F. C. BURUM  2,462,610
PARKING METER RESETTING MECHANISM
Filed Feb. 5, 1948  2 Sheets-Sheet 1
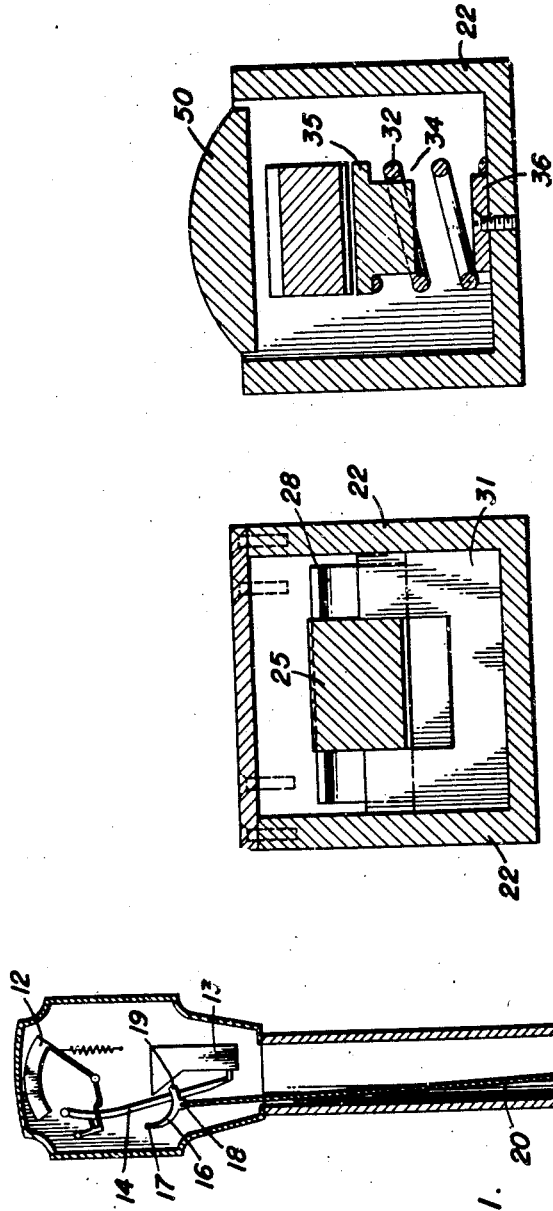
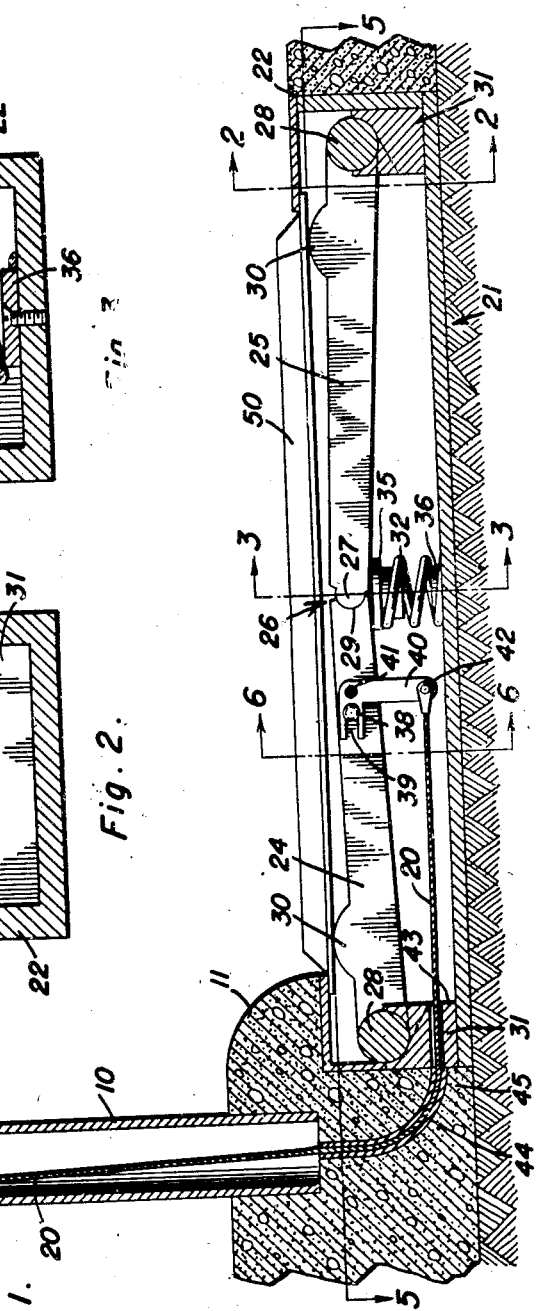
Fisher C. Burum
INVENTOR.
BY Feb. 22, 1949.  F. C. BURUM  2,462,610
PARKING METER RESETTING MECHANISM
Filed Feb. 5, 1948  2 Sheets-Sheet 2
Fig.4
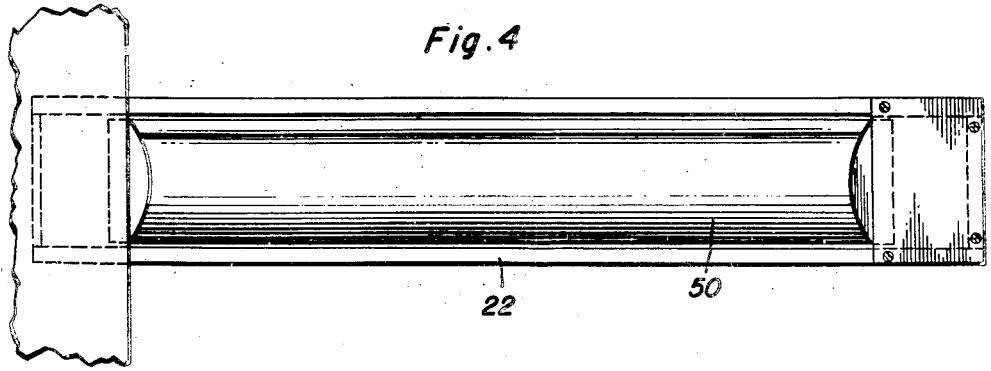
Fig.5.
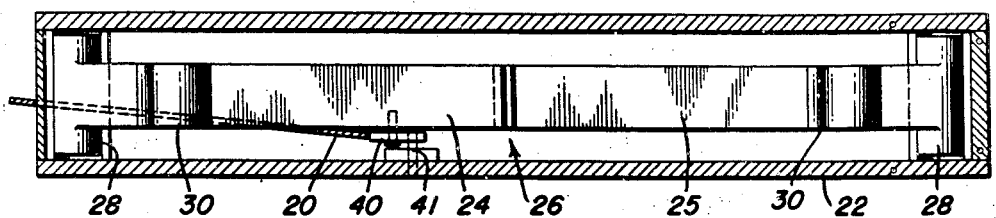
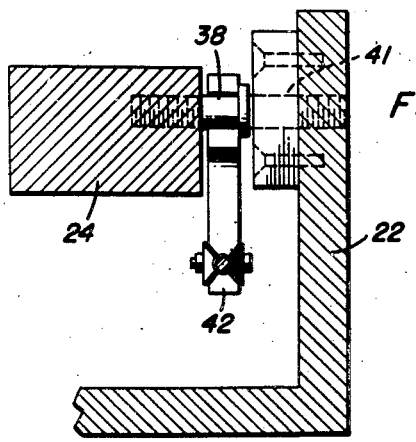
Fig.6.
Fisher C. Burum
  INVENTOR.
BY Patented Feb. 22, 1949

2,462,610

UNITED STATES PATENT OFFICE 2,462,610

PARKING METER RESETTING MECHANISM

Fisher C. Burum, Houston, Tex., assignor of one-third to George B. Lindler, Houston, Tex.

Application February 5, 1948, Serial No. 6,453

3 Claims. (Cl. 74—2)

This invention relates to coin operated parking meters indicating the time of parking of a car on a parking space and it has special reference to devices returning the parking meter to its zero position when the car, the parking time of which is measured, leaves the parking space. If the parking meter is not returned other cars may appropriate the unused time, thus causing a loss of revenue and providing free parking time for cars which otherwise would have stayed away or whose parking time would have been more limited.

In order to return the parking meter to its zero position when the car leaves the guarded parking space a connection between the meter and the vehicle or the ground occupied by the same is necessary. This connection has been provided by electric circuits closed by a switch operated by the weight of the vehicle, by a switch mounted on the curbstone, by conducting rails or the like. However these arrangements are rather complex and need some servicing. Their electrical installation must moreover be weatherproof.

It is the object of the present invention to provide a purely mechanical connection which is simple, effective and weatherproof and which cannot get out of order.

A further object of the invention is to provide an installation which is inconspicuous, which does not form any obstacle for normal vehicular traffic and which does not interfere with the safety of pedestrians crossing the parking space.

A still further object of the invention consists in providing a mechanism which does not require a deep or extensive trench to be dug into the surface.

Still further and more specific objects will be better understood when referring to the detailed specification.

According to the invention a system of pivoted, loosely hinged levers is provided in conjunction with a spring which system is slightly displaced by the weight of a car driving over a member supported by said lever system. This displacement moves a link to which the cable wire, cord or rod operating the parking meter is attached. This member may directly operate the resetting lever of the parking meter.

As the height of the lever system as well as the extent of its movement is limited, the housing enclosing the said system and the trench accommodating said housing are both of a limited width and depth.

The invention will be more fully understood when referring to the accompanying drawing illustrating an embodiment thereof. It is however to be understood that the mechanism illustrated forms merely an example selected for the purpose of explaining the principle of the invention and the best mode it is contemplated applying such principle. Further embodiments will be suggested to the expert by the specification, but no survey of such embodiments is attempted. Modifications of the example shown are therefore not necessarily departures from the invention.

In the drawings:

Figure 1 is an elevational sectional view through the entire installation including the curbstone and the parking meter.

Figures 2 and 3 are cross sectional elevational views the sections being taken along lines 2—2 and 3—3 respectively.

Figure 4 is a plan view of that portion of the installation which is embedded in the parking ground.

Figure 5 is a sectional plan view, the section being taken along line 5—5 of Figure 1.

Figure 6 is an enlarged cross sectional elevational view, the section being taken along line 6—6 of Figure 1.

The parking meter 10 which is not part of the invention, is mounted on or near the curbstone 11. Its mechanism is not shown except for the indicator 12, the coin chute 13 and the coin cashing and resetting lever 14 which when retracted or moved away from the coin chute 13 makes the coin drop into the collection box and resets the indicator to its zero position. A parking meter construction of this type is illustrated more fully in application Serial No. 758,048 made by Robert T. Dick; but it is to be understood that the parking meter may have any approved construction provided it is of the type having a resetting lever which is, as a rule, actuated by the clock mechanism of the meter, but which may also be moved independently by a resetting device.

Such independent movement may be produced by lever 16 pivoted at 17 and provided with an eye 18 to be attached to a wire or cable 20. The lever 16 reaches around the resetting lever 14 and for this purpose is provided with a rearwardly bent end 19, bridge piece or hook like projection which engages the resetting lever 14 and moves it away from the chute 13 when the lever 16 is pulled downwardly.

The parking meter resetting mechanism is operated by the structure actuated by the parked vehicle which is positioned in a narrow and shallow trench 21 running from the curbstone into the parking space. Within this trench an elongated metal box 22 is positioned housing the vehicle operated mechanism. This mechanism comprises the two pivoted load balancing bars 24, 25 which are hinged to each other by means of a knuckle 26 comprising a cylindrical knuckle head 27 on one bar entering a corresponding recess 29 on the other bar. Each bar is supported on cylindrical trunnions 28 pivotally held in bearings 31 mounted within the box 22.

The two bars are each provided with a cam surface 30 on which the anvil plate 50 is supported. This plate may be flat on the inside and rounded on the outside which slightly projects over the box and over the surface of the pavement. Preferably the edges are flush with the pavement and only the middle part projects slightly so that the anvil bar, when a vehicle passes over it, is depressed and presses on the cams of the bar which are also depressed.

It will be noted that the position of the cams 30 is such that their lever arm is short and is only a fraction of the lever arm at which the end of the bars with the knuckle is located, so that the weight counterbalancing forces can be much smaller than the weight of the vehicle.

Below the knuckle a strong coiled or spiral load balancing buffer spring 32 is located on which the knuckle rests. The spring supports a guide block 34 with a cylindrical portion projecting into the interior of the cylindrical or spiral spring and a supporting disk 35 on which the ends of the bars 24, 25 rest. A bumper plate 36 which is arranged at the foot end of the spring stops the guide block and limits the downward movement of the bars. The buffer spring has to support the weight of the vehicle and is to be constructed accordingly. It will be clear that upon downward movement of the two ends of the bar compressing the spring the knuckle forming head and recess remain in engagement with each other.

One of the two bars carries a pin 38 engaging a slot 39 in a bell crank lever 40 pivotally mounted within the box by means of a pivot pin 41. The free end 42 of the bell crank lever is attached to the wire or cable 20 which runs through a bore 43 in the bearing block and wall and through a channel 45 in the curbstone and the hollow interior of the parking meter post 10.

It will be seen from Figure 1 that the wire or cable has to run upwardly and it has therefore to be bent around an angle of 90°. Suitable guiding means are provided for this purpose which consist in the example shown, in a guiding sleeve 44 inserted into the channel 45.

In operation when it is assumed that a coin has been inserted into the parking meter and the clock mechanism is therefore running with the lever 14 in its coin holding position (as shown), and when the vehicle now leaves and runs over the anvil plate 50, the two cam bars 24, 25 will be depressed against the action of the spring 32. The bar 24 and its pin 39 therefore depress one end of the bell crank lever 40 and its other end 42 moves to the right in Figure 1 and pulls the cable 20 moving lever 16 to the left in this figure. Lever 16 thereupon retracts the resetting and coin cashing lever 14 which resets the indicator.

When the parking meter mechanism is of a type requiring the upward pushing of a wire, the bell crank lever is merely turned around on the pin 39 or is fastened on the other balancing lever.

It will be clear that unessential constructive changes do not affect the invention.

Having described the invention what is claimed as new is:

1. A parking meter resetting mechanism including a parking meter resetting lever, comprising a box located in the ground below the pavement, partially open at its upper end, a system of load balancing bars in said box, a balancing spring, and an anvil plate projecting slightly above ground, said anvil plate being in contact with the load balancing levers, a lever mechanism fixed within said box and moved by the movement of one of the load balancing bars, and a connection between said lever and said parking meter resetting lever.

2. A parking meter resetting mechanism including a parking meter resetting lever, comprising a box located in the ground below pavement level, a system of load balancing bars, pivotally mounted within said box, each bar being provided with a cam, a knuckle connection between said bars, a load balancing spring applied against said bars, an anvil plate resting upon the cams of the two bars, and projecting slightly above ground, a lever mechanism fixed within said box and moved by the movement of one of the load balancing bars, and a connection between said lever and said parking meter resetting lever.

3. A parking meter resetting mechanism including a parking meter resetting lever, comprising an elongated box located in the ground below pavement level, a system of load balancing levers pivoted at the two ends of the box and projecting towards each other with their free ends, a knuckle connection between those free ends, a cam surface on each bar between said pivotal connection of the bars, an anvil plate resting on said cam surfaces, said anvil plate projecting slightly above pavement level, a load balancing spring acting on both free lever ends arranged below said knuckle connection, a guide plate held by said spring and supporting said free lever ends, a lever mechanism fixed within said box and moved by the movement of one of the load balancing bars, and a connection between said lever and said parking meter resetting lever.

FISHER C. BURUM.

No references cited.